March 6, 1934.  S. F. FERGUSON ET AL  1,950,340
NONDETACHABLE DEVICE, ESPECIALLY FOR ASSEMBLING LICENSE INSIGNIA
Filed Oct. 2, 1933

Samuel F. Ferguson
A. Verden Watkins
Inventors
By
Attorney

Patented Mar. 6, 1934

1,950,340

UNITED STATES PATENT OFFICE 1,950,340

NONDETACHABLE DEVICE, ESPECIALLY FOR ASSEMBLING LICENSE INSIGNIA

Samuel F. Ferguson and A. Verden Watkins, Toledo, Ohio, assignors to The Kant Take-Off Nut Company, Toledo, Ohio, a corporation of Ohio Application October 2, 1933, Serial No. 691,800

2 Claims. (Cl. 85—32)

This invention relates to fasteners, especially of a non-detachable type.

This invention has utility when incorporated in a one-way clutch nut for assembly with the threaded stem of a bolt as in mounting against unauthorized removal of an insignia or identification, as a license plate for a motor vehicle.

Referring to the drawing.

Figure 1:
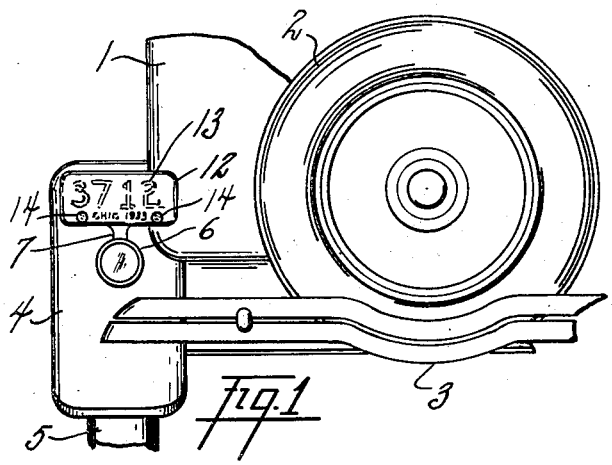
Fig. 1 is a fragmentary rear elevation of a motor vehicle having an embodiment of the invention incorporated therewith.
Figure 3:
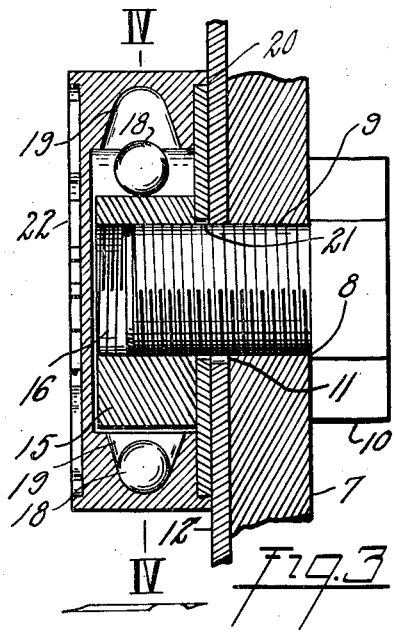
Fig. 3 is a section on the line III—III, Fig. 2.
Figure 2:
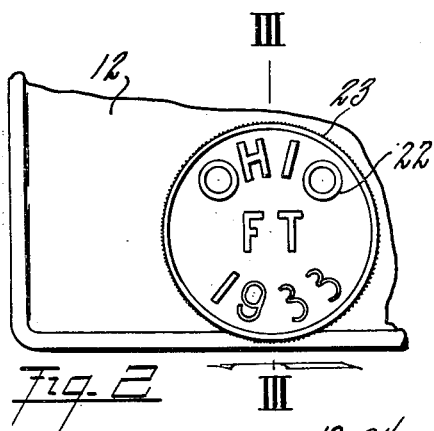
Fig. 2 is a detail view of the invention of Fig. 1, on an enlarged scale.
Figure 4:
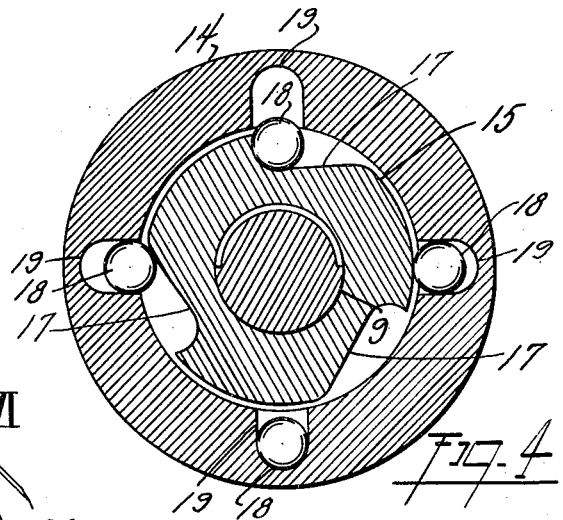
Fig. 4 is a section on the line IV—IV, Fig. 3.
Figure 5:
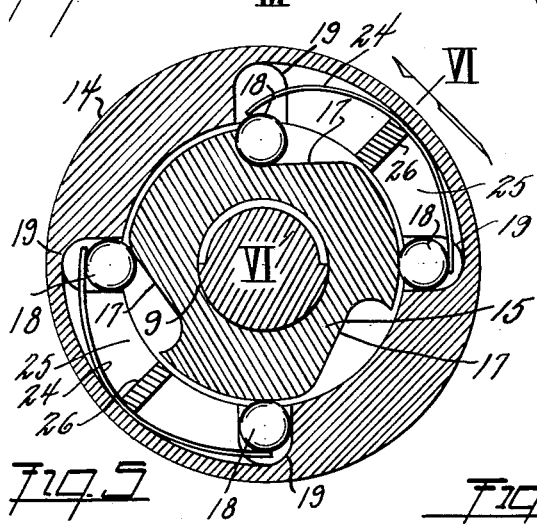
Fig. 5 is a view similar to Fig. 4 with spring means for urging the balls or ball clutches into clutching relation.
Figure 6:
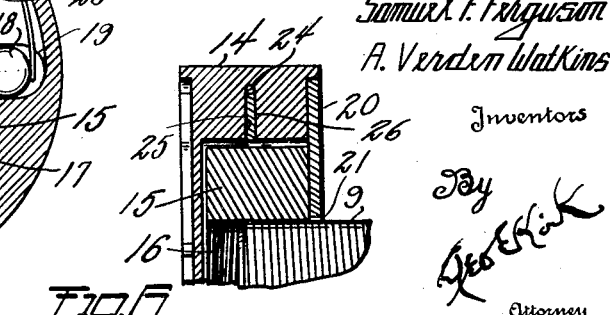
Fig. 6 is a section on the line VI—VI, Fig. 5.

Motor vehicle 1 is shown as having spare tire 2, bumper 3, rear left fender 4, wheel 5, stop light 6, and license bracket 7 rising from such stop light 6. This license bracket 7 has opening 8 therein through which may be inserted externally threaded bolt 9 having head 10 to abut the side of the bracket 7 toward the car and thereby protrude through opening 11 in insignia or license plate 12, thus mounting this plate 12 so that its notation 13 is in position to be displayed to passing traffic.

On the threaded portion 9, as protruding through the plate 12, may be mounted housing 14. This housing 14 has therein element 15 with internally threaded portion 16 and external annular series of seats 17 in which may fall balls 18 from recesses 19 in the housing 14. The depths of the seats 17 are less than the diameters of the balls 18 so that these balls 18 may cooperate as ball clutches. The seats 17 are inclined in a common direction, which is such that, for a right hand threaded portion 9, of the bolt 9, 10, there may be a rotation clockwise of the housing 14 to effect gripping of the one-way ball clutch between the housing 14 and the element 15 of this nut, thereby making readily possible setting up of this housing on the threaded portion 9.

This housing 14, after the balls 18 and the element 17 are assembled therewith, has disk 20 as a closure plate retaining the housing 14 and the element 15 as a unit. This disk 20 is press-fitted or otherwise fixed in its assembly with the housing 14 against casual displacement. This disk 20 has opening 21 aligned with the internally threaded opening 16 in the element 15 with a slight clearance thereover so that the threaded portion 9 may readily come into complementary coacting relation with the threaded portion 16. This housing 14 on the side remote from the disk 20 may have identification data 22, which may be that supplied with the insignia or license plate for supplemental identification as for the year for the fastener device, as well as notation for the character of the vehicle upon which the device may be attached; as for instance, "Ford truck", or other identification in keeping with the fee which may be paid in conjunction with the issuance of this license.

It is thus seen that once attached to the vehicle bracket 7, it may not be removable and that for substitution of a plate or license for a subsequent year, all the operator may be required to do is to, with a wrench, engage knurled periphery 23 of the housing 14 and twist such to an extent to wreck the entire housing 14, thus making possible removal of the plate 12 and substitution of another plate and requirement for a substitute housing for the bolt and nut assembly.

In practice, this housing 14 is, as to its material, of a non-corrosive character so that in exposure to weathering conditions, there may not be rusting to lock the balls in engaged or non-engaged position. The running up of the housing as to the plate 12 brings this clutch nut into a weather-sealed assembly position with the plate 12, and there is lock nut effectiveness in this pinch assembly hereunder for any movement of the housing 14 counter-clockwise, in the event there is clockwise rotation for threading the element 15 on the portion 9, is an unclutching operation and does not in any way effect backing off of the element 15, which thus stays in its binding or locked position with the threaded portion 9.

In some instances, it may be desirable to depend on other means than gravity to urge the balls 18 into the seats 17. To this end spring element 24 may be introduced into way 25 and retained by wedge block 26. The normal curvature of this spring 24 is such as to urge the balls 18 out of the seats 19.

What is claimed and it is desired to secure by Letters Patent is:

1. A nut comprising an element having an internally threaded portion, an integral housing surrounding the element and at one end, said housing having an open end, a disk anchored in the housing open end, and one-way ball clutch means directly between the element and housing, said housing and element each having seats short of extending radially therethrough and of different number for the housing as to the element, and balls in one series of the seats cooperating for differing angular coaction with the other series of seats.

2. A bolt, a nut therefor comprising an element having an internally threaded portion, an integral housing surrounding the element and at one end thereof, said housing having an open end, a disk anchored in the housing open end through which disk the bolt may protrude into the housing there to be engaged by the element, and one-way ball clutch means directly between the element and housing, balls for said clutch means, said housing having seats for the balls, and said element having in different angular series complementary seats for the balls.

SAMUEL F. FERGUSON.
A. V. WATKINS.